Jan. 5, 1937.  D. C. HOLMES  2,066,976

VALVE ACTUATING PUSH PIECE

Filed March 29, 1935  2 Sheets-Sheet 1

D. C. Holmes
INVENTOR

By Glascock Downing &Seebold
Attys.

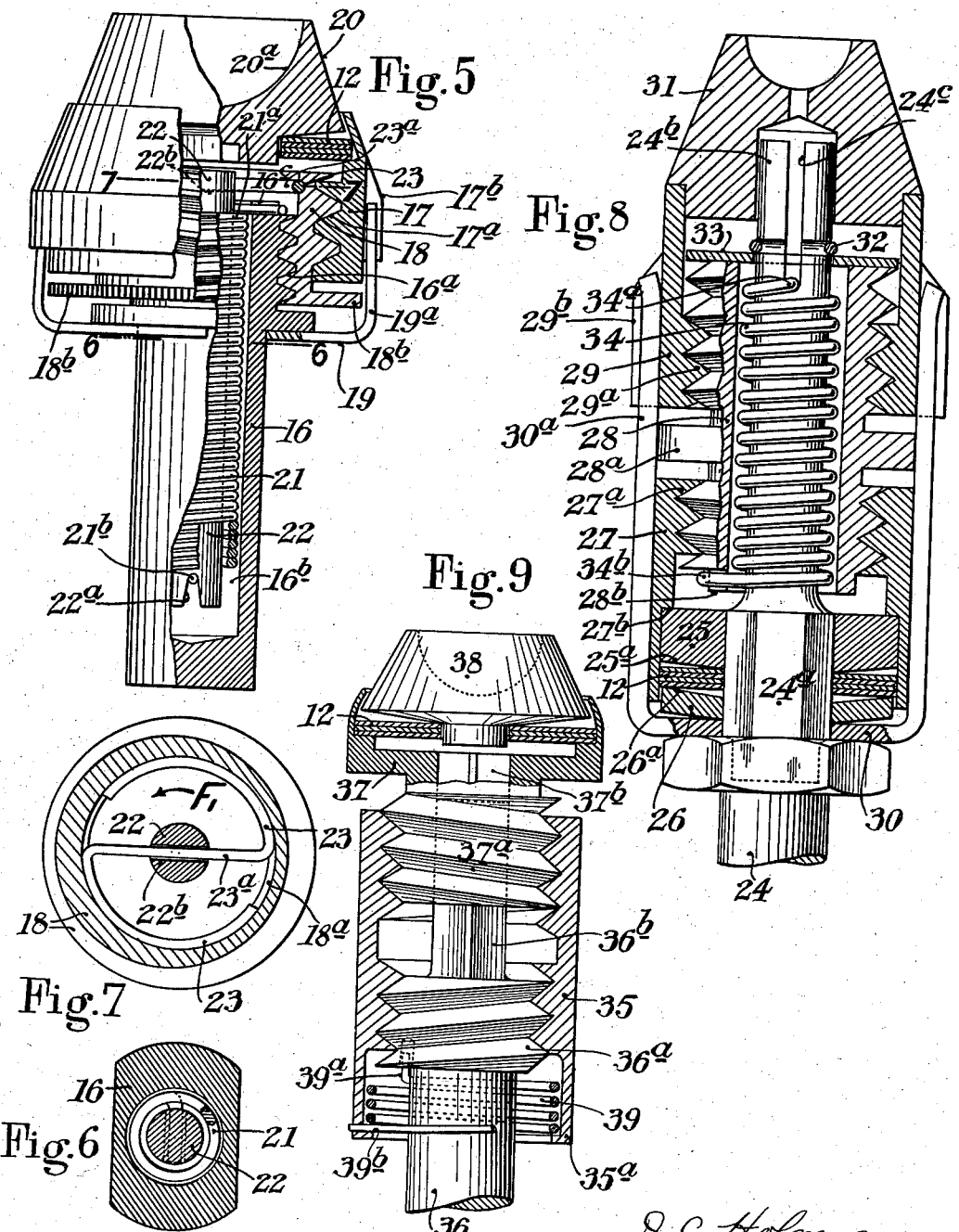

Patented Jan. 5, 1937

2,066,976

UNITED STATES PATENT OFFICE 2,066,976

VALVE-ACTUATING PUSH-PIECE

Dan Campbell Holmes, Ville D'Avray, France

Application March 29, 1935, Serial No. 13,764
In France April 4, 1934

4 Claims. (Cl. 123—90)

This invention has for its object improvements in or relating to valve-actuating push-pieces or heads for use in internal combustion or like engines and more particularly to so-called self-adjusting push-pieces or tappets which are made up of two elements, viz.: a push-piece or head proper adapted to act upon the valve stem and which is movable with respect to the other element or shank of said push-piece.

In actuating push-pieces of the kind described the movable head in the lifted position of the valve is urged downward by the action of a valve return spring, such motion being allowed either by a delivery of fluid in those push-pieces the elements of which are hydraulically interconnected or by a sliding action in those where such interconnection is secured by screw threads or like mechanical means.

As the valve closes the head comes back to its initial position by the action of the fluid pressure or of a return spring depending on whether the push-piece pertains to one or the other of the above mentioned types.

The effect of such self-adjusting push-pieces in normal operation is to do away with every back-lash between same and the valve stems in spite of wear and thermal expansion.

They however display the following inconveniences:

First of all, in such internal combustion or like engines which are not designed for the provision of self-adjusting push-pieces, a clearance is provided purposedly between the valve stem and its push-piece which has to be maintained in order that the best operating conditions may be secured.

The fitting of self-adjusting push-pieces on such engines and the consequent doing away with clearances result in setting the engine distribution out of order by altering the valve opening and closing times and are prejudicial to good operation, particularly at low speeds.

Secondly, in self-adjusting push-pieces of the above described mechanical type, it sometimes happens that the head becomes wedged as a result of friction with the valve or between the screw-shaped block and its threaded shank. As long as such wedging continues the adjustment to be secured by the push-piece is no longer obtained and this particularly results in that the valve does not close completely when the parts expand.

The push-piece according to this invention is designed to avoid such inconveniences.

With this end in view it comprises a movable abutment or head which is adapted to deform elastically under the pressure exerted thereon by the valve stem as a result of the stress on the return spring of said valve and the forces of inertia.

The amplitude of said deformation of the push-piece head under such pressure is equivalent to the adjustment clearance which is left normally under the valve stem, so that distribution may take place exactly in the conditions contemplated.

On the other hand, a wedging action of the push-piece head on the valve stem cannot take place by virtue of the deformability of the former, whereby a complete closing of the valve is secured at all times.

Another object of my invention resides in improvements in or relating to the head adjusting device proper, i. e. to the connecting means between the push-piece head and shank.

Various embodiments of the subject matter of this invention are shown merely by way of example in the drawings appended hereto.

Figure 5 is an elevational view of another embodiment with parts shown in section.

Figures 6 and 7 are fractional cross-sections taken on lines 6—6 and 7—7 in Fig. 5 respectively.

Figures 8 and 9 are vertical cross-sections through two additional modifications respectively.

Figure 1:
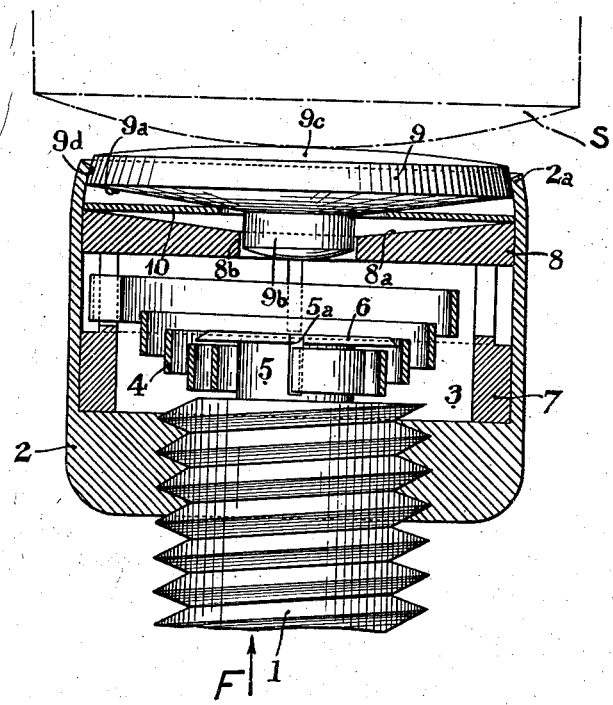
Figure 1 is a vertical cross-section through one embodiment.

Fig. 1 illustrates a self-adjusting push-piece of known type which comprises a male element consisting in a screw-threaded shank 1 on which the movable head or block proper is screwed which comprises a female cup-shaped element 2 with a chamber therein.

The interconnection of elements 1 and 2 moreover is secured by a coil spring 4 one end of which is made rigid with element 1 e. g. by the engagement of a tenon 5 rigid with said element in a slit 5a, the first turns of said spring being retained under a disc 6 which likewise is rigid with element 1. The other end of said spring is secured to a ring 7 frictionally fitted within chamber 3.

Said chamber is closed by a disc 8 secured to element 2.

The push-piece is actuated by a timing device, e. g. a cam, which acts upon the screw-threaded shank 1 as shown by arrow F or upon an abutment rigid with said shank, and ring 8 in turn actuates the valve stem as indicated in dot-and-dash lines at S which is urged permanently in a direction opposite to that shown by arrow F by a return device in known manner. According to my invention ring 8 bears on the under side of the valve stem through the intermedium of a device which is adapted to deform elastically under the force transmitted thereto and which is designed as follows:

The outer face 8a of ring 8 provides a hollow cone the depth of which is slightly larger than the maximum adjustment clearance provided under the valve stem. A depth of about 0.5 mm. is suitable for most of internal combustion engines.

Arranged above ring 8 is a movable abutment 9 made of case-hardened steel or any other suitable equivalent material and the general shape of which is that of a mushroom. Said abutment 9 comprises a tail-piece 9b which is slidably received in a central hole 8b in ring 8 and which guides said abutment in its displacements with respect to the movable head.

That face 9a of abutment 9 which is directed towards ring 8 is shaped into a projecting cone which has the same aperture as the hollow cone 8a provided by said ring in order that it may fit exactly within the same.

The outer face 9c of abutment 9 bears on the under side of the valve stem and may have any suitable e. g. flat or convex shape in order that such engagement may be obtained in the desired conditions.

Interposed between ring 8 and the movable abutment 9 is a spring return device comprising e. g. one or more spring steel washers 10 which engage with their outer edges face 8a of ring 8 and with their inner edges the under side 9a of abutment 9.

Said washers 10 are kept in central relation to the push-piece movable head e. g. as a result of their outer edges being fitted within the wall of the cup-shaped member 2 as shown or their central holes being fitted on the abutment tail-piece 9b which projects therethrough.

When the push-piece is operative on the valve stem the transmission of force involved for lifting the latter causes the washer or washers 10 to bend between either conical seat 8a, 9a thereof until elements 8, 10, 9 fit into one another as a rigid structure.

As the valve closes the washer or washers 10 on releasing will bring the deformable device back into its initial position.

The width of the washers, i. e. the difference between their outer and inner radii, is so chosen that the displacement of the movable abutment shall correspond to the clearance provided under the valve stem. Putting $l$ as the value of such width, $\theta$ that of the angle at the apex of the conical seats 8a, 9a and $d$ that of said displacement, a relation has to be obtained between said values as follows:

$$d = l \cos \frac{\theta}{2}$$

The thickness of each washer, with due regard to the properties of the metal same is made of, must be such that it shall undergo but elastic deformations, while their number must be such that the movable abutment 9 shall undergo its full displacement under the action of a pressure which is slightly lower than the static pressure of the valve spring in the closed position of the valve.

In this manner the movable abutment will always be displaced by the desired amount and on the other hand such blows as are set up by the valve-actuating means will be dampened.

Abutment 9 is retained within the movable head by the bent in edge 2a of the cup-shaped member 2 which surrounds a frusto-conical seat 9d on the abutment.

The bent in portion 2a is produced e. g. by means of a suitably shaped die.

Any other suitable means may also be used to retain abutment 9: for instance, a tenon may be used which fits within a slot sufficiently ovalized in the direction of displacement of the abutment to allow such displacement in the conditions explained.

Figure 2:
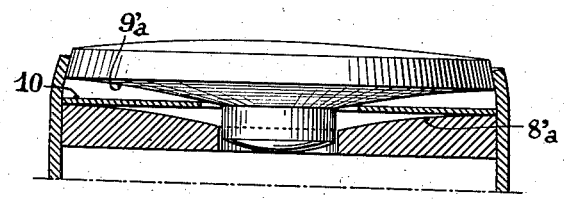
Figures 2 to 4 are fractional vertical cross-sections through three modifications respectively.

Fig. 2 illustrates an improved modification in which the washer or washers 10 cooperate with seats which instead of straight have curved generatrices in order that the thrust may be distributed uniformly on said washer or washers.

Lubrication is secured satisfactorily by the oil present on the head and which is sucked and forced by the displacement of the movable abutment.

It is to be understood that the invention is not limited to the embodiments described above merely by way of example and that every suitable modification may be made easily in the same according to the indications given without thereby departing from the scope of the invention. Alterations may be made particularly in the movable abutment and the spring return device cooperating therewith; for instance, washers 10 may receive a setting bend in a direction contrary to that of the slope of the above described seats 8a, 9a which then would be substituted by flat seats, when washers 10 would be similar to conical spring washers. The arrangement described above may also be embodied in any other push-piece than the one taken as an example; more particularly, the connection between the shank and the movable head in such push-pieces might be secured by other mechanical means than the one indicated or by hydraulic or like means.

Instead of providing a pair of conical or like seats arranged at either side of the spring washer or washers only one such seat may be provided, the other then being replaced by a shoulder or equivalent abutting means engaged by the spring washer or washers.

Figure 3:
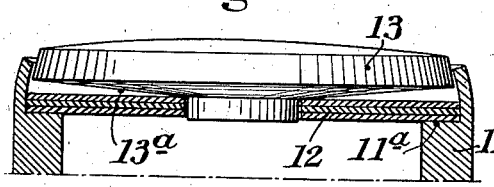

As shown in Fig. 3 the inner wall 11 of the push-piece hollow or cup-shaped element provides a shoulder 11a on which a spring pile 12 is seated.

Abutment 13 which provides the push-piece head bears on washers 12 with its under face 13a which as in the examples described hereinbefore has such frusto-conical convex shape that the deflection of springs 12 under the force necessary to lift the valve be limited to a value adapted to the machine operating conditions.

Figure 4:
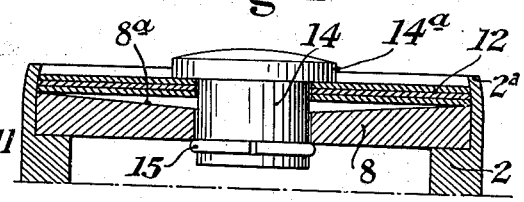

In the modification illustrated in Fig. 4 springs 12 bear on a concave frusto-conical seat 8a on a ring 8 as described above, but the abutment or push-piece head 14 here cooperates with said springs 12 only through the intermedium of a shoulder 14a.

A bent in portion 2a at the edge of the cup-shaped member 2 keeps springs 12 in position. The abutment 14 is held in position by a locking spring wire 15 arranged below washer 8.

The use of one single instead of two conical seats for limiting the retractive deformation of the device simplifies the manufacture of the same and secures a more favourable distribution of the stresses on the spring washers; same have a less tendency to break under the blow produced at the moment when the valve is lifted.

According to my invention, improvements are made also in such means as secure a self-adjusting connection between that element of the push-piece which cooperates with the valve stem and the one which is acted on by the cam or like timing device.

In the embodiment shown in Fig. 5 a male or shank member 16 which cooperates with the cam is formed with a screw-threaded upper end 16a which is connected with a female or cup-shaped member 17 through an intermediate or sleeve member 18.

Sleeve 18 is formed with an internal screw-thread which fits on screw-thread 16a and with an external screw-thread directed contrawise to screw-thread 16a and adapted to fit within an internally screw-threaded portion 17a in the cup-shaped member 17.

The cup-shaped member 17 is connected to shank 16 in such manner that it may slide therein without rotating with respect thereto. In the embodiment considered a brake is used for that purpose which comprises a collar 19 thrust over a portion of shank 16 which has a non-circular section—e. g. such as shown in Fig. 6—and arms 19a that are bent up against the cup-shaped member 17 and that can be engaged within slots 17b in the latter.

In such conditions a rotation of sleeve 18 in a definite direction with respect to the push-piece elements 16 and 17 will result in a longitudinal displacement of said sleeve in a definite direction with respect to shank 16 and a longitudinal displacement of the cup-shaped member 17 in the same direction with respect to the sleeve. Consequently, the cup-shaped member will undergo a displacement with respect to the shank which is the sum of both above elementary longitudinal displacements.

The cup-shaped member 17 cooperates with the actuated member through the intermedium of a head 20 connected to said cup-shaped member by spring connecting means comprising washers 12 the arrangement of which is similar to the one described above with reference e. g. to Fig. 3.

The push-piece is urged in the direction of extension by a return device comprising a coil spring 21 housed in a recess 16b within shank 16. The upper end 21a of said spring is made rigid with shank 16 by the engagement of the upper edge of recess 16b within a slot 16c.

Spring 21 is threaded over a rod 22 the lower end 21b of which is made rigid therewith by the engagement of said spring within a slit 22a in said rod.

The upper end of rod 22 comprises another slit 22b in which the central portion 23a of an S-shaped locking spring wire is engaged both ends of which are urged to open by the spring action of said wire and which thereby are kept in engagement within a groove 18a in sleeve 18.

Said spring wire 23 provides a friction locking device which will slide within groove 18a when sleeve 18 is rotated with respect to rod 22 in the direction shown by the arrow F while it will stress spring 21 when said relative rotation tends to take place in the reverse direction. The stress of return spring 21 acts in the last mentioned direction.

The locking spring wire 23 can thus be rotated within sleeve 18 with a view to adjust the initial stress on spring 21.

In addition, the length of the head may be varied by rotating the sleeve. The latter at the outside of the cup-shaped member 17 comprises a milled collar 18b which facilitates such length adjustment.

Such system of connection by means of an intermediate member with right-and-left screw-threads between either push-piece element as described possesses the following advantages:

In engines with rotary push-pieces the friction between the push-piece head and the valve stem has no influence on sleeve 18 which can freely sink under the valve pressure and the action of vibration and also mount under the stress of return spring 21, its motion encountering only such resistances as act on the external and internal threads thereof and which are substantially constant for a given pressure.

In the usual push-piece types where the head has to rotate while rubbing on the valve stem the frictional resistance varies substantially by reason of the unevennesses of the surfaces in contact. Such friction in rotary push-piece engines has also a tendency to screw the push-piece head in or out depending on the direction of rotation of the push-piece. This results in an undesirable modification of the push-piece length and consequently in either a wedging action which precludes complete closing of the valve or in a too far-reaching downward motion of the head which sets up a momentary backlash causing an increased noise similar to that which is connected with ordinary non-self-adjusting push-pieces.

On the other hand, as explained hereinbefore, the increase or decrease in the length of the push-piece is comparatively considerable for a slight rotary motion of the push-piece. Thus, a slight rotary motion necessary to balance an expansion of the valve stem is obtained through a very small displacement of the sleeve. The latter in addition has a low moment of inertia. By all these reasons self-adjustment intervenes sooner in response to valve expansion and the restoration of the contact with the valve stem is also more rapid, whereby a device is obtained which is even more silent in action than the old type and which also is more satisfactory in operation.

Another advantage is that by reason of the rotary motion of sleeve 18 in response to expansion being very small the stress on return spring 21 remains comparatively constant whereas in conventional types the stress on the return means generally varies substantially with the position of the movable head.

Finally, the cup-shaped member 17 which in operation is held only by the brake 19—19a admits of an initial setting which generally is necessary by reason of the considerable tolerances allowed ordinarily in the heights between the cams and the valve stems.

For such setting it is only necessary after sleeve 18 has been screwed home on rod 16 to pull aside the brake arms 19a and to rotate the cup-shaped member 17 with respect to the sleeve in order to set the desired initial height. Where the cup-shaped member 17 has a hexagonal outline setting can be effected with an approximation of ⅙ of a revolution, which corresponds in height to ⅙ of the screw-thread pitch.

Generally a castellated or splined cup-shaped member as shown is preferable in order to deal with the pressure due to the rotation of the push-piece and as a rule four castellations or splines 17b will ensure a sufficiently accurate initial setting.

By reason of the easiness in the initial setting and the small amplitude of the rotary motion which the sleeve has to undergo in order to secure self-adjustment the total angular motion of spring 21 is also very small, which permits the use of a spring having a low initial tension; for instance, the structure may be arranged in such manner that said spring be completely released by rotation of sleeve 18 to the extent of one revolution or so. By virtue of such arrangement if the valve happens to be wedged momentarily in its lifted position within its guide, which involves maximum protraction of the push-piece, such protraction will be limited to a very small amount, e. g. about two millimeters, after which the return spring is completely released; by these reasons normal adjustment is restored most easily and almost instantaneously.

The last described push-piece type is particularly suitable for rocker valve push-pieces in which the push-piece bears on a ball head whereby a high frictional resistance to the rotation of the push-piece is involved.

In this push-piece type the head or abutment 20 is formed with a cup-shaped seating 20a.

It will be understood that the intermediate member connecting either push-piece element in the conditions described may be embodied in any other manner than in the form of an internally and externally threaded sleeve.

For instance, in the embodiment shown in Fig. 8, the lifting of push-piece shank 24 involves that of a seat 25 through the intermedium of an additional seat 26 and spring washers 12 which cooperate with conical bearing surfaces 25a, 26a on seats 25 and 26 respectively according to an arrangement described hereinbefore, the seat 26 here providing the movable head which now faces the shank instead of the valve stem but which again operates in the conditions described.

Engaging the upper edge of seat 25 with a shoulder 27b is a sleeve 27 which is formed with an external thread 27a cut above said shoulder 27b.

Screwed in thread 27a is one end of a connecting sleeve 28 the other end of which is formed with an external thread fitted within a screw-threaded portion 29a in another sleeve or cup-shaped member 29. Threads 27a and 29a are cut in opposite directions.

Sleeve 28 in its middle is provided with an easily accessible shoulder or flange 28a.

Both sleeves 27 and 29 can slide without rotating with respect to each other, for which purpose a brake is provided that comprises a collar 30 thrust over a non-circular—e. g. hexagonal—portion 24a of rod 24 and arms 30a which engage said sleeves. In the embodiment considered the arms 30a are fitted within slots 29b in sleeve 29 and engage the faces of sleeve 27 which is assumed to be hexagonal externally.

Sleeve 29 engages the under side of the valve stem through the intermedium of a movable head 31 in which the end 24b of rod 24 is centrally guided, said rod or shank extending through the whole height of the push-piece.

Said rod moreover is locked by a spring wire 32 in engagement with a washer 33 seated on the upper end of sleeve 28.

The return device whereby the push-piece is urged toward its protracted position comprises a spring 24 threaded over rod 24. The upper end 34a of said spring is received in a slit 24c in rod 24 whereby it is connected with sleeve 27 through the intermedium of seat 25. The lower end 34b of spring 34 is received in a notch 28b in sleeve 28.

This device is similar in operation and adjustment to the one shown in Fig. 6.

Fig. 9 illustrates another modification in which the intermediate or sleeve member provides a connection between either push-piece element through right-and-left internal threads.

Said sleeve 35 is screwed on the end 36a of the push-piece shank 36. The cup-shaped member 37 comprises a threaded tail-piece 37a which is screwed in sleeve 35 by means of threads cut in reverse direction to that of thread 36a.

Both elements 36, 37 of said push-piece in addition are connected with each other in such manner that they can only slide without rotating with respect to each other. Such connection in this embodiment is secured most simply by means of a projection 36b of shank 36 which has a non-circular section and which is received within a correspondingly shaped recess 37b in cup-shaped member 37.

The cup-shaped member 37 engages the under side of the valve stem through the intermedium of an abutment or movable head 38 and of spring washers 12 arranged in the manner already described.

The return device whereby the push-piece is urged toward its protracted position comprises a coil spring 39 housed in a projection 35a of sleeve 35 and connected on one hand to shank 36 at one end 39a thereof and on the other hand to sleeve 35 at its other end 39b.

I claim:

1. In a valve tappet for internal combustion engines, the combination of a cup-shaped head, a concave conical bearing member with a central hole in this head, at least one flat lamination with a central hole arranged for resting on the external periphery of said bearing member, an abutting member with an inner conical face, arranged for resting on the internal edge of said lamination, a central spigot, integral with said abutting member and arranged for engaging the central hole of the lamination and of the bearing member, and means for retaining said abutting member in said cup-shaped head.

2. In a valve tappet for internal combustion engines, the combination of a cup-shaped head, with an annular shoulder, provided at the inside near the opening, at least one flat lamination with a central hole, arranged for resting with its outer periphery on said annular shoulder, an abutting member with an inner conical face, arranged for resting on the internal edge of said lamination, a central spigot, integral with said abutting member and arranged for engaging the central hole of said lamination, and means for retaining said abutting member in said cup-shaped head.

3. In a self-adjusting valve tappet for internal combustion engines, the combination of a cup-shaped head, a concave conical bearing member with a central hole in this head, at least one flat lamination with a central hole arranged for resting on the external periphery of said bearing member, an abutting member with an inner conical face, arranged for resting on the internal edge of said lamination, a central spigot integral with said abutting member and arranged for engaging the central hole of the lamination and of the bearing member, and means for retaining said abutting member in said cup-shaped head, a ring fitted into said cup-shaped head and arranged for resting on the bottom of said head, said concave conical bearing being arranged for resting on said ring, a screw screwed into the bottom of said cup-shaped head, a tenon integral with said screw and provided at the end of this screw which is engaged in said cup-shaped head, a disc at the end of said tenon, a coil spring wound around said tenon, means for securing said spring to said tenon and means for securing said spring to said ring, said spring being arranged to be bent when the screw is screwed in and to unscrew said screw when unbending.

4. In a self-adjusting valve tappet for internal combustion engines, the combination of a cup-shaped head, with an annular shoulder, provided at the inside near the opening, at least one flat lamination with a central hole, arranged for resting with its outer periphery on said annular shoulder, an abutting member with an inner conical face, arranged for resting on the internal edge of said lamination, a central spigot, integral with said abutting member and arranged for engaging the central hole of said central lamination, means for retaining said abutting member in said cup-shaped head, a threaded tail-piece, integral with said cup-shaped head and projecting from its bottom, a sleeve in one end of which is screwed said tail-piece, a threaded push-piece shank, screwed in the other end of said sleeve, the threads of this push-piece shank being cut in reverse direction to those of said threaded tail-piece, means connecting said tail-piece to said push-piece and arranged for preventing relative rotation between these two elements, a coil spring arranged for surrounding said push-piece and one end of which is connected to said push-piece, the other end being connected to said sleeve.

DAN CAMPBELL HOLMES.